United States Patent
Chen et al.

(10) Patent No.: US 9,571,250 B2
(45) Date of Patent: *Feb. 14, 2017

(54) USER EQUIPMENT (UE) A APPARATUS FOR CHANNEL STATE INFORMATION FEEDBACK IN A COORDINATED MULTI-POINT COMMUNICATION SYSTEM

(71) Applicant: TEXAS INSTRUMENTS INCORPORATED, Dallas, TX (US)

(72) Inventors: Runhua Chen, Plano, TX (US); Anthony E. Ekpenyong, Houston, TX (US); Ralf M. Bendlin, Portland, OR (US); Eko N. Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,854

(22) Filed: Jul. 15, 2016

(65) Prior Publication Data

US 2016/0352487 A1     Dec. 1, 2016

Related U.S. Application Data

(63) Continuation of application No. 13/851,949, filed on Mar. 27, 2013, now Pat. No. 9,401,748.

(60) Provisional application No. 61/615,984, filed on Mar. 27, 2012.

(51) Int. Cl.
*H04L 5/00* (2006.01)
*H04B 7/06* (2006.01)
*H04B 7/04* (2006.01)

(52) U.S. Cl.
CPC ............ *H04L 5/0048* (2013.01); *H04B 7/043* (2013.01); *H04B 7/0626* (2013.01); *H04B 7/0632* (2013.01); *H04B 7/0639* (2013.01)

(58) Field of Classification Search
CPC ...... H04W 24/00; H04W 36/30; H04W 40/12; H04W 72/085
USPC .......................................................... 370/252
See application file for complete search history.

(56) References Cited

U.S. PATENT DOCUMENTS

| | | | |
|---|---|---|---|
| 9,401,748 B2 * | 7/2016 | Chen | H04B 7/0417 |
| 2008/0268862 A1 * | 10/2008 | Kent | H04B 7/0632 455/452.2 |
| 2011/0170435 A1 * | 7/2011 | Kim | H04L 5/0023 370/252 |
| 2011/0249643 A1 | 10/2011 | Barbieri et al. | |
| 2012/0155291 A1 * | 6/2012 | Koivisto | H04B 7/024 370/252 |
| 2014/0247749 A1 | 9/2014 | Kim et al. | |

* cited by examiner

*Primary Examiner* — Afshawn Towfighi
(74) *Attorney, Agent, or Firm* — Ronald O. Neerings; Charles A. Brill; Frank D. Cimino

(57) ABSTRACT

A method of operating a wireless communication system (FIG. 4) is disclosed. The method includes receiving a plurality of reference signals from a respective plurality of transceivers (402). Each of the plurality of reference signals is measured to produce a respective plurality of channel state information (CSI) measurements (404). An aggregated channel quality indicator (CQI) is calculated from measuring the plurality of reference signals (406). The aggregated CQI is transmitted to at least one transceiver of the respective plurality of transceivers (408).

20 Claims, 4 Drawing Sheets

US 9,571,250 B2

USER EQUIPMENT (UE) A APPARATUS FOR CHANNEL STATE INFORMATION FEEDBACK IN A COORDINATED MULTI-POINT COMMUNICATION SYSTEM

BACKGROUND OF THE INVENTION

This application is a continuation of prior Application No. 13/851,949, filed Mar. 27, 2013, which claims the benefit under 35 U.S.C. §119(e) of Provisional Appl. No. 61/615,984, filed Mar. 27, 2012 (TI-72062PS2), which is incorporated herein by reference in its entirety.

The present embodiments relate to wireless communication systems and, more particularly, to operation of a Coordinated Multi-Point (CoMP) communication system in which a user equipment (UE) simultaneously communicates with plural base stations (eNB).

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is frequency domain data symbols. The frequency domain tones at either edge of the hand may be set to zero and are called guard tones. These guard tones allow the OFDM signal to it into an appropriate spectral mask. Some of the frequency domain tones are set to values which will be known at the receiver. Among these are channel state information reference signals (CSI-RS). These are reference signals that are useful for channel measurement at the receiver. In a coordinated multi-point (CoMP) communication system these channel state reference signals are not precoded and are generated by a pseudo-random sequence generator as a function of the UE cell ID. In the Long Term Evolution (LTE) system of Releases 8, 9, and 10 for conventional point-to-point communication, the cell ID is not explicitly signaled by the eNB but is implicitly derived by the UE as a function of the primary synchronization signal (PSS) and secondary synchronization signal (SSS). To connect to a wireless network, the UE performs a downlink cell search to synchronize to the best cell. A cell search is performed by detecting the PSS and SSS of each available cell and comparing their respective signal quality. After the cell search is performed, the UE establishes connection with the best cell by deriving relevant system information for that cell. Similarly, for LTE Release 11 the UE performs an initial cell search to connect to the hest cell. To enable multi-point CoMP operation, the connected cell then configures the UE by higher-layer signaling with a virtual cell ID for each CSI-RS resource associated with each respective base station involved in the multi-point CoMP operation. The UE generates the pseudo-random sequence for each CSI-RS resource as a function of the virtual cell ID.

Conventional cellular communication systems operate in a point-to-point single cell transmission fashion where a user terminal or equipment (UE) is uniquely connected to and served by a single cellular base station (eNB or eNodeB) at a given time, An example of such a system is the 3GPP Long-Term Evolution (LTE Release-8). Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system. This greatly improves received signal strength at the UE by transmitting the same signal to each UE from different base stations. This is particularly beneficial for cell edge UEs that observe strong interference from neighboring base stations.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base station's coverage area is further divided into cells. In the illustrated network, each base station's coverage area is divided into three cells. A handset or other user equipment (UE) 109 is shown in cell A 108. Cell A 108 is within coverage area 104 of base station 101. Base station 101 transmits to and receives transmissions from UE 109. As UE 109 moves out of Cell A 108 into Cell B 107, UE 109 may be handed over to base station 102. Because UE 109 is synchronized with base station 101, UE 109 can employ non-synchronized random access for a handover to base station 102. UE 109 also employs non-synchronous random access to request allocation of uplink 111 time or frequency or code resources. If UE 109 has data ready for transmission, which may be traffic data, a measurements report, or a tracking area update, UE 109 can transmit a random access signal on uplink 111. The random access signal notifies base station 101 that UE 109 requires uplink resources to transmit the UE's data. Base station 101 responds by transmitting to UE 109 via downlink 110 a message containing the parameters of the resources allocated for the UE 109 uplink transmission along with possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval. Base station 101 configures UE 109 for periodic uplink sounding reference signal (SRS) transmission. Base station 101 estimates uplink channel quality indicator (CQI) from the SRS transmission.

While the preceding approaches provide steady improvements in wireless communications, the present inventors recognize that still further improvements in transmission of channel state information (CSI) from the UE to the eNB are possible. Accordingly, the preferred embodiments described below are directed toward this as well as improving upon the prior art.

BRIEF SUMMARY OF THE INVENTION

In a preferred embodiment of the present invention, there is disclosed a method of operating a wireless communication system. The method includes receiving a plurality of reference signals (CSI-RS) from a respective plurality of transceivers. Each of the respective plurality of reference signals is measured at the UE to produce a respective plurality of channel state information (CSI) estimates. An aggregated channel quality indicator (CQI) is calculated from the respective plurality of CSI estimates. The aggregated CQI is transmitted to at least one transceiver of the respective plurality of transceivers.

DETAILED DESCRIPTION OF THE INVENTION

Figure 1:
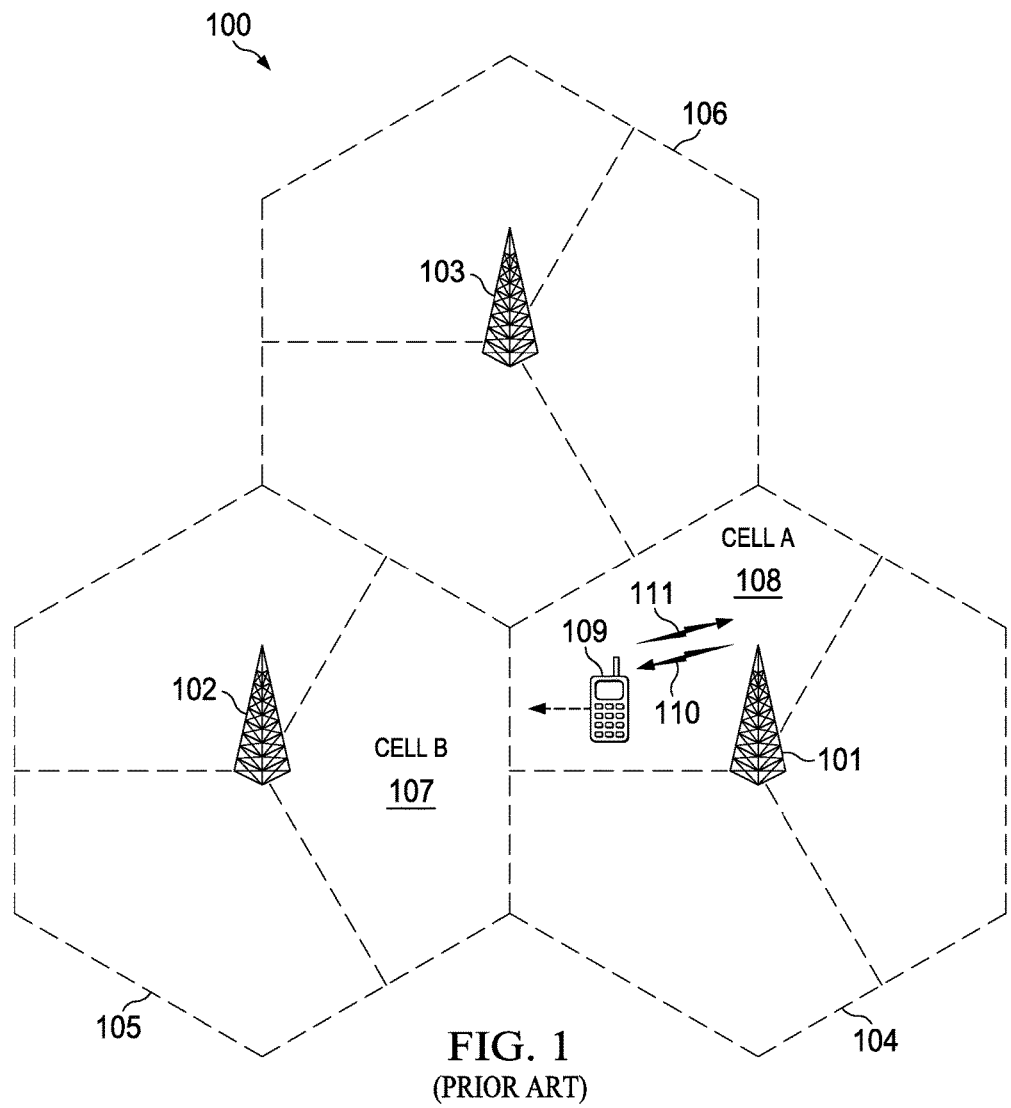
FIG. 1 is a diagram of a wireless communication system of the prior art.

Channel state information (CSI) feedback from user equipment (UE) to a base station (eNB) is essential for operating a coordinated multi-point (CoMP) LTE wireless communication system. This CSI feedback facilitates transmission parameter selection, beamforming, scheduling, interference alignment, and other factors necessary for an effective communication system. Accordingly, embodiments of the present invention employ channel state information reference signals (CSI-RS) to derive and feed back an aggregated channel quality indicator (CQI) and/or an aggregated precoding matrix indicator (PMI) to improve feedback from the UE to the eNB.

The following abbreviations are used throughout the instant specification.

eNB: E-UTRAN Node B or base station
UE: User Equipment
CSI: Channel State Information
CQI: Channel Quality Indicator
CSI-RS: Channel State Information Reference Signal
E-UTRAN: Evolved Universal Terrestrial Radio Access Network
PDCCH: Physical Downlink Control Channel
PDSCH: Physical Downlink Shared Channel
PUCCH: Physical Uplink Control Channel
PUSCH: Physical Uplink Shared Channel
CRS: Cell-specific Reference Signal
LTE: Long Term Evolution
DL: DownLink
UL: UpLink
PMI: Precoding Matrix Indicator
RI: Rank Indicator
RRC: Radio Resource Control
PRB: Physical Resource Block
QAM: Quadrature Amplitude Modulation
IRC: Interference Rejection Combining
MRC: Maximum Ratio Combining
BLER: Block Error Rate
DPS: Dynamic Point Selection
JT: Joint Transmission
MIMO: Multiple-Input Multiple-Output
SNR: Signal to Noise Ratio Traditional wireless networks operate in a point-to-point transmission manner where a UE connects to and receives data from a single base station. For data transmission, the base station performs downlink scheduling in order to allocate different frequency resources for downlink transmission to different UEs, possibly using different code rates, QAM constellation sizes, transmit powers, and MIMO preceding vectors. Downlink scheduling at the eNB is enabled by knowledge of channel state information (CSI), which is measured and reported by the UE. In LTE, a CSI report comprises a set of MIMO transmission properties recommended by the UE based on the downlink channel measurement, including rank indicator, preceding matrix indicator, and channel quality indicator. Rank indicator (RI) denotes the number of data streams (layers) recommended for downlink transmission. The value of RI feedback can vary from 1 to the minimum of eNB transmit antennas and UE receive antennas. Preceding matrix indicator (PMI) indicates the best preceding matrix that the UE recommends for downlink transmission. Channel quality indicator (CQI) is an indicator of the quantized signal-to-noise ratio which the UE is able to observe when the reported PMI and RI are used for hypothetical data transmission. In general, one CSI report comprises RI, PMI, and CQI, or a subset thereof. In a conventional wireless network, the reported CSI is per-point CSI corresponding to a single-cell channel with respect to the connected base station. UE selection of the PMI/CQI report is dependent on proprietary UE receiver implementation (e.g. MRC or IRC) and is transparent to the wireless standard. Ideally, the reported PMI/CQI should optimize a certain performance metric (e.g. maximum sum throughput) subject to a 10% BLER. This is also used in 3GPP RAN Working Group 4 for setting UE performance requirements for PMI/CQI. The legacy CSI report implicitly reflects both channel and interference components. That is, there is no separate feedback for channel and interference, respectively. Without loss of generality, the reported CQI can be denoted as a quantization of equation [1], $$CQI = \frac{\|u'Hw\|_2^2}{I+N} \quad [1]$$

where H is the per-point channel, w is the PMI, I is the interference power, N is the noise power, u is the receiver equalizer, and ' is the Hermitian operator.

Figure 2:
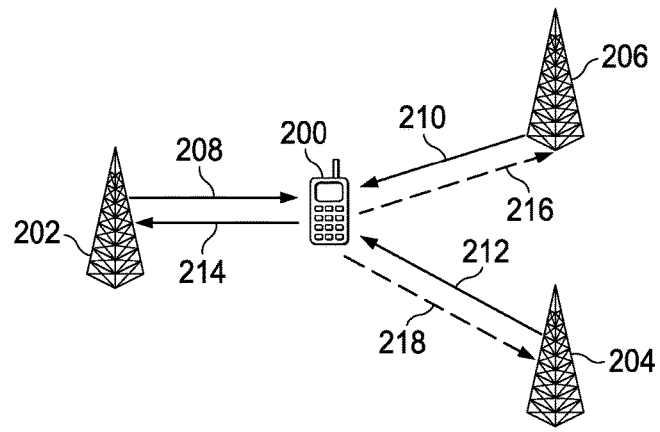
FIG. 2 is a diagram of a Coordinated Multi-Point communication system of the present invention.

Referring to FIG. 2, there is a diagram of a coordinated multi-point (CoMP) wireless communication system according to the present invention. The communication system includes user equipment (UE) 200 and base stations (eNB) 202, 204, and 206. These base stations may be macro eNB, pico eNB, femto eNB, or other suitable transmission points (TP). For UE 200, a plurality of CSI-RS resources is configured based on which the UE can measure in the downlink channel. Each CSI-RS resource can be associated by the E-UTRAN with a base station, a remote radio head (RRH), or a distributed antenna. UE 200 is configured by higher-layer RRC signaling with a specific virtual cell identifier (ID) for each CSI-RS resource. These virtual cell IDs are used by a pseudo-random sequence generator to generate the channel state reference signals (CSI-RS) corresponding to each CSI-RS resource. UE 200 receives each virtual cell ID from higher layer RRC signaling after establishing initial cell connection with the best cell. The CSI-RS from eNBs 202, 204, and 206 are transmitted to UE 200 over wireless channels 208, 212, and 210, respectively.

For CoMP, per-point CSI feedback is a baseline where the UE reports CSI of each base station separately. Since each base station is associated with a CSI-RS resource, this is equivalent to per-CSI-RS-resource feedback. Several different implementations of per-CSI-RS-resource feedback are possible. In one embodiment, per-point CQI and per-point PMI are reported for each configured CSI-RS resource. Alternatively, per-point CSI information is explicitly reported for a subset of base stations. For other base stations without explicit per-point CSI feedback, per-point CSI information can be inferred or estimated from other CSI reports (e.g. aggregated CQI) when available. It is possible that per-CSI-RS-resource CSI feedback comprises a subset of RI, PMI, and CQI information. In one embodiment, at least per-point PMI pertaining to legacy LTE definition is reported for each configured CSI-RS resource. Such PMI is an indication of the spatial characteristics for each CoMP measurement point and important for all CoMP transmission schemes. It could be used for single-point beamforming in dynamic point selection, for interference alignment in coordinated beamforming and scheduling, and for coherent and non-coherent beam combining in joint processing. In addition, per-point CQI is needed for all CoMP schemes to enable point selection, perform interference alignment in coordinated beamforming/scheduling and joint transmission. In one embodiment, per-point CQI is reported for each configured CSI-RS resource. This provides the maximum scheduling flexibility. With per-point CQI of all CSI-RS resources, the eNB scheduler is able to dynamically switch between different CoMP transmission schemes and/or dynamically fall back to single-point transmission, based on quickly changing system conditions such as cell loading, traffic type, or UE mobility. In another embodiment, per-point CQI is reported for one or a subset of CSI-RS resources. For instance, a UE-centric feedback for DPS may report CQI for the selected point plus a point selection indicator, while CQI for other points is not reported. For points without CQI feedback, CQI is either unavailable or has to be predicted by the base station from other feedback information (e.g. aggregated CQI) which reduces the accuracy of per-point CQI.

Since per-point CQI is derived under single-point transmission hypothesis, it is likely to be less accurate for CoMP link adaptation such as JT, where signals from multiple transmission points are combined either coherently or non-coherently at the UE receiver. In contrast, aggregated CQI aims to improve the link adaptation accuracy of CoMP joint transmission. With this scheme, an aggregated CQI is calculated by the UE to reflect the downlink SNR when all base stations jointly transmit data to the UE. Assume a CoMP measurement set comprising K points, where per-point PMI is reported for each point. UE 200 receives the composite signal y in equation [2] from K transmission points. Here H is the channel state and $v_1$ is the precoding hypothesis for each of K eNBs. In the example of FIG. 2 K=3, but in a practical CoMP network K may be greater or less than 3. In one embodiment, aggregated CQI is derived assuming precoding with $v_k$ on the k-th measurement point (e.g. k-th CSI-RS resource), where $v_k$ is the PMI feedback corresponding to the k-th measurement point. Essentially, such an aggregated CQI corresponds to incoherent CoMP-JT beamforming with the following received signal y.

$$y = HV = [H_1, H_2, \ldots H_K] \begin{bmatrix} v_1 \\ v_2 \\ \vdots \\ v_K \end{bmatrix}$$ [2]

In another embodiment, aggregate CQI is derived assuming precoding with $e^{j\theta_1} v_k$ on the k-th measurement point (e.g. k-th CSI-RS resource), where $v_k$ is the PMI feedback, and $\theta_k$ is the inter-point co-phasing feedback corresponding to the k-th point. Essentially, such an aggregated CQI corresponds to coherent CoMP-JT beamforming with the following received signal y in equation [3].

$$y = HV = [H_1, H_2, \ldots H_K] \begin{bmatrix} e^{j\theta_1} v_1 \\ e^{j\theta_2} v_2 \\ \vdots \\ e^{j\theta_K} v_K \end{bmatrix}$$ [3]

The aggregated CQI reflects a boosted SNR value when all transmission points jointly transmit data to the UE. It is possible that the aggregated CQI may be larger than the summation of per-point CQIs. It is also possible to report multiple aggregated CQIs, each of which is derived under different CoMP transmission set hypotheses. For instance, assume the CoMP measurement set has three transmission points (TP1, TP2, and TP3). The UE may report an aggregated CQI corresponding to each combination of two points in the measurement set and/or report an aggregated CQI corresponding to the entire CoMP measurement set. Multiple aggregated CQIs, if reported on the PUCCH channel, can be time-division multiplexed on different PUCCH transmissions at different time instances. Otherwise, if multiple aggregated CQIs are to be reported on the PUSCH channels, they can be transmitted in the same PUSCH transmission, or transmitted in different PUSCH transmissions.

UE 200 transmits the aggregated CQI to primary eNB 202 over channel 214. UE 200 may optionally transmit the aggregated CQI over channels 216 and 218 to eNBs 206 and 204 of the CoMP network.

The aggregated CQI is computed by the UE based on the downlink quality associated with the aggregated channel over M transmission points along with their respective precoding hypotheses. The M transmission points are a subset within set size K. When M=K, only one aggregated CQI is reported corresponding to all transmission points of the set K. Alternatively, when M<K, there are $$\binom{M}{K}$$

possibilities. In this case, it is possible to report either a few or all of the respective CQIs.

There are multiple ways to configure the aggregated CQI information by the eNB. The aggregated CQI mainly targets link adaptation for coherent/non-coherent joint transmission but is not required for coordinated beamforming/scheduling and dynamic point selection. From this perspective, aggregated CQI can be configured UE-specifically by higher layer signaling. On the other hand, whether aggregated CQI should be explicitly reported also depends on the decision of per-point feedback. As one possibility, the UE may report per-point CQI for all points plus aggregated CQI. As another possibility, the UE may report per-point CQI for one or a subset of points plus aggregated CQI.

Figure 3:
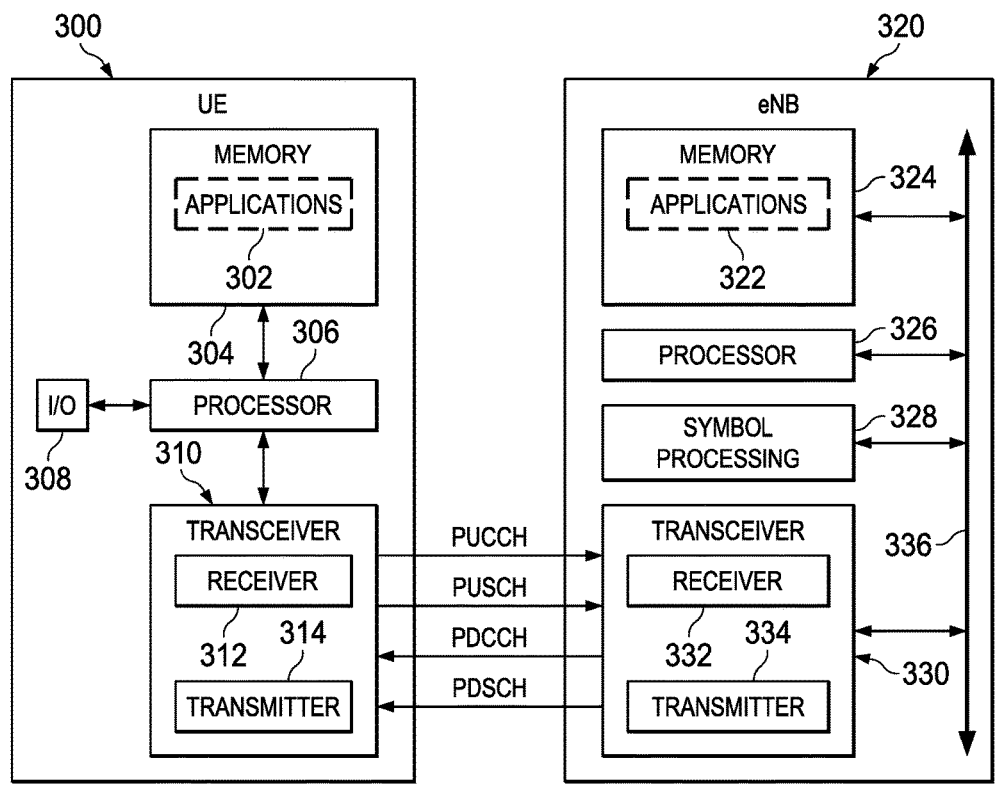
FIG. 3 is a diagram showing communication between a user equipment (UE) and a base station (eNB) according to the present invention.

Turning now to FIG. 3, there is a diagram showing communication between user equipment (UE) 300 and a base station (eNB) 320 according to the present invention.

UE 300 may be a cell phone, computer, or other wireless network device. UE 300 includes a processor 306 coupled to a memory 304 and a transceiver 310. Processor 306 may include several processors adapted to various operational tasks of the UE including signal processing and channel measurement and computation. The memory stores application software that the processor may execute as directed by the user as well as operating instructions for the UE. Processor 306 is also coupled to input/output (I/O) circuitry 308, which may include a microphone, speaker, display, and related software. Transceiver 310 includes receiver 312 and transmitter 314, suitable for wireless communication with eNB 320. Transceiver 310 typically communicates with eNB 320 over various communication channels. For example, transceiver 310 sends uplink information to eNB 320 over physical uplink control channel PUCCH and physical uplink shared channel PUSCH. Correspondingly, transceiver 310 receives downlink information from eNB 320 over physical downlink control channel PDCCH and physical downlink shared channel PDSCH.

Base station 320 includes a processor 326 coupled to a memory 324, a symbol processing circuit 328, and a transceiver 330 via bus 336. Processor 326 and symbol processing circuit 328 may include several processors adapted to various operational tasks including signal processing and channel measurement and computation. The memory stores application software that the processor may execute for specific users as well as operating instructions for eNB 320. Transceiver 330 includes receiver 332 and transmitter 334, suitable for wireless communication with UE 300. Transceiver 330 typically communicates with UE 300 over various communication channels. For example, transceiver 330 sends downlink information to UE 300 over physical downlink control channel PDCCH and physical downlink shared channel PDSCH. Correspondingly, transceiver 330 receives uplink information from UE 300 over physical uplink control channel PUCCH and physical uplink shared channel PUSCH.

Figure 4:
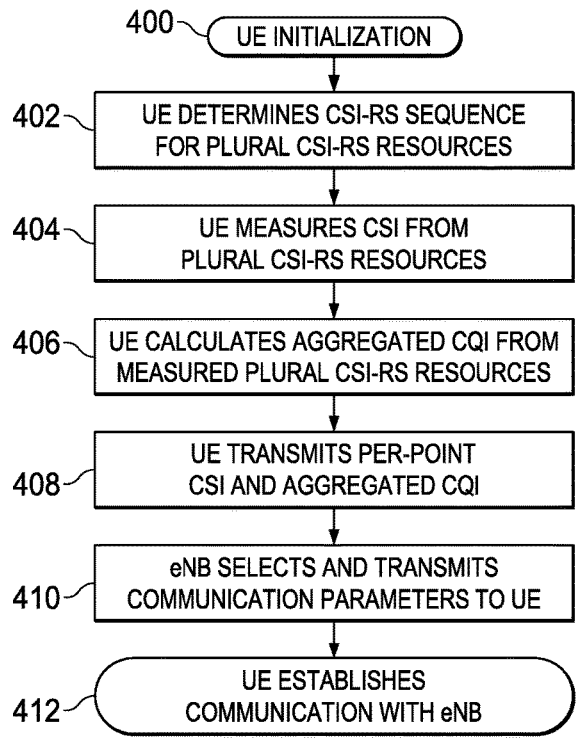
FIG. 4 is a flow chart showing channel state information (CSI) feedback according to a first embodiment of the present invention.

FIG. 4 is a flow chart showing channel quality indicator (CQI) feedback according to a first embodiment of the present invention. Operation begins with UE initialization 400 when the UE enters the CoMP configuration. The UE determines a primary eNB and synchronizes with other suitable eNBs as indicated by the CoMP configuration. The UE determines the virtual cell ID for each CSI-RS resource. At block 402, the UE determines CSI-RS sequence for plural CSI-RS resources. The UE measures 404 per-point CSI from each of the CSI-RS resources. The UE calculates 406 an aggregated CQI from the plural CSI-RS resources. The UE subsequently transmits 408 the per-point CSI and aggregated CQI to the primary eNB. Responsively, the primary eNB selects and transmits 410 appropriate communication parameters to the UE. At block 412, the UE communicates with the plurality of eNBs subject to the received communication parameters.

Figure 5:
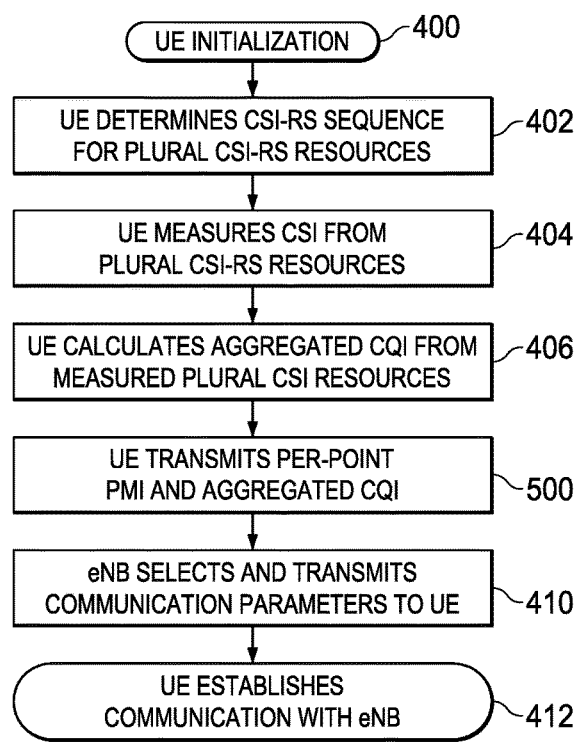
FIG. 5 is a flow chart showing channel state information (CSI) feedback according to a second embodiment of the present invention.

FIG. 5 is a flow chart showing precoding matrix indicator (PMI) feedback according to a second embodiment of the present invention. Operation proceeds as previously described with respect to FIG. 4. At block 500, however, the UE transmits per-point PMI hypotheses and an aggregated CQI report to the primary eNB. Responsively, the primary eNB selects and transmits 410 appropriate communication parameters to the UE. At block 412, the UE communicates with the plurality of eNBs subject to the received communication parameters.

Figure 6:
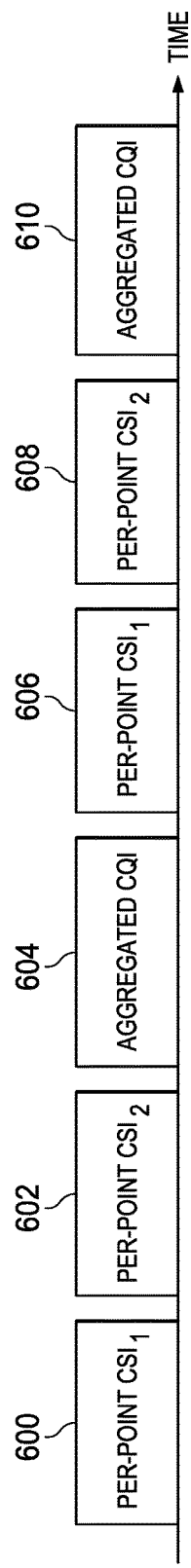
FIG. 6 is a time division multiplex diagram showing CSI feedback on the Physical Uplink Control Channel (PUCCH) according to the present invention.

Referring to FIG. 6, there is a time division multiplex diagram showing per-point CSI and aggregated CQI feedback on the Physical Uplink Control Channel (PUCCH) according to one embodiment of the present invention. A first per-point $CSI_1$ measurement is transmitted at 600 followed by a second per-point $CSI_2$ at 602. Here, the subscript indicates a particular per-point CSI-RS source in the CoMP configuration. Other per-point CSI measurements (not shown) are subsequently transmitted followed by an aggregated CQI report at 604. At blocks 606 and 608, a second set of per-point measurements of $CSI_1$ and $CSI_2$ are respectively transmitted followed by a second aggregated CQI report 610.

Figure 7A:
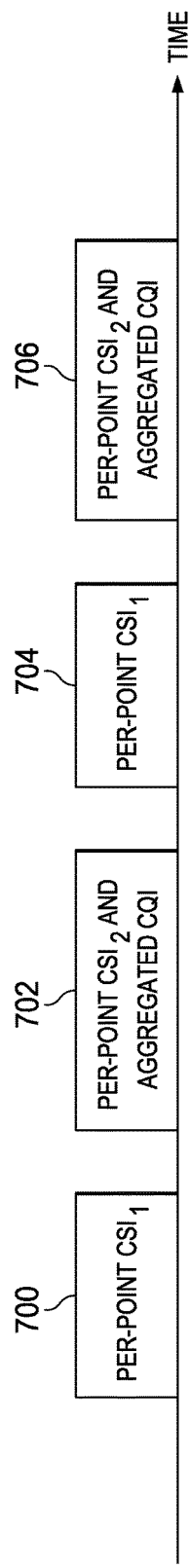
FIG. 7A is a time division multiplex diagram showing CSI feedback on the Physical Uplink Control Channel (PUCCH) according to another embodiment of the present invention.

FIG. 7A is a time division multiplex diagram showing CSI feedback on the Physical Uplink Control Channel (PUCCH) according to another embodiment of the present invention. Here, a first per-point $CSI_1$ measurement is transmitted at 700. A second per-point $CSI_2$ transmitted at 702 together with an aggregated CQI report. Other per-point CSI measurements (not shown) may also be transmitted. A second set of per-point measurements is then transmitted beginning with $CSI_1$ at block 704. Next per-point measurement $CSI_2$ is transmitted at 706 together with a second aggregated CQI report.

Figure 7B:
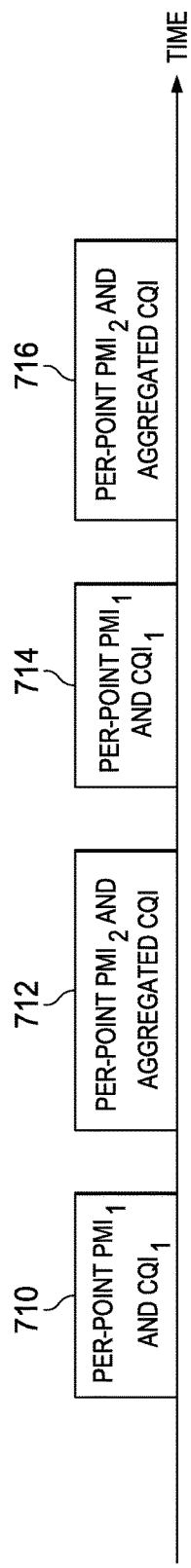
FIG. 7B is a time division multiplex diagram showing CSI feedback flow on the Physical Uplink Control Channel (PUCCH) according to yet another embodiment of the present invention.

Turning now to FIG. 7B, there is a time division multiplex diagram showing PMI feedback flow on the Physical Uplink Control Channel (PUCCH) according to yet another embodiment of the present invention. Here, a first per-point $PMI_1$ hypothesis and $CQI_1$ measurement are transmitted at 710. A second per-point $PMI_2$ hypothesis is transmitted at 712 together with an aggregated CQI report. Other per-point PMI hypotheses (not shown) may also be transmitted. A second set of per-point hypotheses is then transmitted beginning with $PMI_1$ and per-point $CQI_1$ report at block 714. Next, per-point hypothesis $PMI_2$ is transmitted at 716 together with a second aggregated CQI report.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A user equipment (UE) comprising:
   circuitry for receiving a plurality of reference signals from a respective plurality of base stations;
   circuitry for measuring the plurality of reference signals to generate an aggregated channel quality indicator (CQI) for a subset of the plurality of reference signals, wherein the aggregated CQI reflects a link quality associated with an effective aggregated channel of a subset of the respective plurality of base stations;
   circuitry for measuring each of the plurality of reference signals to generate a respective plurality of per-point channel state information (CSI);
   circuitry for transmitting the aggregated CQI and at least one of the per-point CSI to at least one of the respective plurality of base stations.

2. A user equipment (UE) as in claim 1, wherein the per-point CSI comprises a per-point preceding matrix indicator (PMI).

3. A user equipment (UE) as in claim 2, wherein the per-point CSI comprises a per-point channel quality indicator (CQI), and wherein the per-point CQI is derived under a hypothesis of single-point multiple-input multiple-output (MIMO) beamforming on a base station of the respective plurality of base stations using a precoding matrix indicted by the respective per-point PMI.

4. A user equipment (UE) as in claim 2, wherein the aggregated CQI is derived under a hypothesis of joint transmission from the respective plurality of base stations, wherein each of the plurality of base stations uses a respective precoding matrix indicated by the respective per-point PMI.

5. A user equipment (UE) as in claim 1, wherein the per-point CSI comprises a per-point co-phasing factor.

6. A user equipment (UE), comprising the steps of:
circuitry for receiving a plurality of reference signals from a respective plurality of transceivers;
circuitry for measuring the plurality of reference signals to generate an aggregated channel quality indicator (CQI), wherein the aggregated CQI reflects a link quality associated with an effective aggregated channel of the respective plurality of transceivers, wherein the aggregated CQI is derived under a hypothesis of joint transmission from the respective plurality of transceivers, wherein precoding by each of the plurality of transceivers uses a respective precoding matrix indicated by the respective per-point PMI, which is phase rotated by a respective per-point co-phasing factor;
circuitry for measuring each of the plurality of reference signals to generate a respective plurality of per-point channel state information (CSI) wherein the per-point CSI comprises a per-point co-phasing factor;
circuitry for transmitting at least one of the per-point CSI to the at least one transceiver; and
circuitry for transmitting the aggregated CQI and at least one of the per-point CSI to at least one transceiver of the respective plurality of transceivers.

7. A user equipment (UE) as in claim 2, wherein the aggregated CQI and the at least one per-point CSI are transmitted on Physical Uplink Control Channel (PUCCH) in different uplink subframes.

8. A user equipment (UE) as in claim 3, wherein the aggregated CQI and the at least one per-point PMI are transmitted on a Physical Uplink Control Channel (PUCCH) in a same uplink subframe.

9. A user equipment (UE), comprising:
circuitry for receiving a plurality of reference signals from a respective plurality of base stations;
circuitry for measuring each of the plurality of reference signals to produce a respective plurality of channel state information (CSI) signals for a subset of the plurality of reference signals;
circuitry for calculating an aggregated channel quality indicator (CQI) from the subset of the respective plurality of CSI signals; and
circuitry for transmitting the aggregated CQI and at least one of the CSI signals to at least one base station of the respective plurality of base stations wherein the aggregated CQI and the at least one of the CSI signals are transmitted on a Physical Uplink Control Channel (PUCCH) in different uplink subframes.

10. A user equipment (UE), comprising:
circuitry for receiving a plurality of reference signals from a respective plurality of base stations;
circuitry for measuring each of the plurality of reference signals to produce a respective plurality of channel state information (CSI) signals for a subset of the plurality of reference signals;
circuitry for calculating an aggregated channel quality indicator (CQI) from the subset of the respective plurality of CSI signals; and
circuitry for transmitting the aggregated CQI and at least one of the CSI signals to at least one base station of the respective plurality of base stations, wherein the aggregated CQI and the at least one of the CSI signals are transmitted on a Physical Uplink Control Channel (PUCCH) in a same uplink subframe.

11. A user equipment (UE), comprising:
circuitry for receiving a plurality of reference signals from a respective plurality of base stations;
circuitry for measuring each of the plurality of reference signals to produce a respective plurality of channel state information (CSI) signals for a subset of the plurality of reference signals;
circuitry for calculating an aggregated channel quality indicator (CQI) from the subset of the respective plurality of CSI signals, wherein each of the respective plurality of CSI signals comprises a per-point CSI; and
circuitry for transmitting the aggregated CQI to at least one base station of the respective plurality of base stations.

12. A user equipment (UE), comprising:
circuitry for receiving a plurality of reference signals from a respective plurality of base stations;
circuitry for measuring each of the plurality of reference signals to produce a respective plurality of channel state information (CSI) signals for a subset of the plurality of reference signals;
circuitry for calculating an aggregated channel quality indicator (CQI) from the subset of the respective plurality of CSI signals, wherein each of the respective plurality CSI signals comprises a per-point preceding matrix indicator (PMI); and
circuitry for transmitting the aggregated CQI to at least one base station of the respective plurality of base stations.

13. A user equipment (UE), comprising:
circuitry for transmitting a first reference signal to a user equipment (UE);
circuitry for receiving a precoded matrix indicator (PMI) from the UE in response to the first reference signal;
circuitry for receiving an aggregated information signal from the UE in response to a subset of the first reference signal, a second reference signal from a second base station, and a third reference signal from a third base station, wherein the aggregated information signal and the PMI are received on a Physical Uplink Control Channel (PUCCH) in different uplink subframes; and
circuitry for transmitting communication parameters to the UE in response to the aggregated information signal.

14. A user equipment (UE), comprising:
circuitry for transmitting a first reference signal to a user equipment (UE);
circuitry for receiving a precoded matrix indicator (PMI) from the UE in response to the first reference signal;
circuitry for receiving an aggregated information signal from the UE in response to a subset of the first reference signal, a second reference signal from a second base station, and a third reference signal from a third base station, wherein the aggregated information signal and the PMI are received on a Physical Uplink Control Channel (PUCCH) in a same uplink subframe; and
circuitry for transmitting communication parameters to the UE in response to the aggregated information signal.

15. A user equipment (UE), comprising:
circuitry for transmitting a first reference signal to a user equipment (UE);
circuitry for receiving a per-point channel state information (CSI) signal from the UE in response to the first reference signal;
circuitry for receiving an aggregated information signal from the UE in response to a subset of the first reference signal, a second reference signal from a second base station, and a third reference signal from a third base station; and
circuitry for transmitting communication parameters to the UE in response to the aggregated information signal.

16. A user equipment (UE) as in claim 15, wherein the aggregated information signal and the per-point CSI signal are transmitted on a Physical Uplink Control Channel (PUCCH) in different uplink subframes.

17. A user equipment (UE), comprising:
circuitry for receiving a plurality of reference signals from a respective plurality of base stations;
circuitry for measuring each of the plurality of reference signals to generate a respective plurality of per-point channel state information (CSI);
circuitry for measuring the plurality of reference signals to generate an aggregated channel quality indicator (CQI), wherein the aggregated CQI reflects a link quality associated with an effective aggregated channel of the respective plurality of base stations;
circuitry for transmitting at least one of the per-point CSI to at least one of the plurality of base stations; and
circuitry for transmitting the aggregated CQI to at least one of the plurality of base stations.

18. A user equipment (UE), comprising:
circuitry for receiving a plurality of reference signals from a respective plurality of base stations;
circuitry for measuring the plurality of reference signals to generate at least two aggregated channel quality indicators (CQIs), each of which is derived under different Coordinated Multi-Point (CoMP) transmission set hypotheses, wherein the aggregated CQIs reflect a link quality associated with an effective aggregated channel of subsets of the respective plurality of base stations; and
circuitry for transmitting the aggregated CQIs to at least two of the respective plurality of base stations.

19. A user equipment (UE), comprising:
circuitry for determining channel state information (CSI)-RS sequences for plural channel state information (CSI)-RS resources;
circuitry for measuring channel state information (CSI) from the plural CSI-RS resources;
circuitry for calculating an aggregated channel quality indicator (CQI) from the measured plural CSI-RS resources; and
circuitry for transmitting per-point-CSI and the aggregated CQI.

20. A user equipment (UE) of operating a user equipment (UE), the UE performing each of the following, comprising:
circuitry for determining channel state information (CSI)-RS sequences for plural channel state information (CSI)-RS resources;
circuitry for measuring channel state information (CSI) from the plural CSI-RS resources;
circuitry for calculating an aggregated channel quality indicator (CQI) from the measured plural CSI-RS resources; and
circuitry for transmitting per-point precoding matrix indicator (PMI) and the aggregated CQI.

* * * * *